United States Patent [19]
Etoh

[11] Patent Number: 5,137,104
[45] Date of Patent: Aug. 11, 1992

[54] SYSTEM AND METHOD FOR AUTOMATICALLY CONTROLLING VEHICLE SPEED TO DESIRED CRUISE SPEED

[75] Inventor: Yoshiyuki Etoh, Kanagawa, Japan

[73] Assignee: Nissan Motor Company, Limited, Yokohama, Japan

[21] Appl. No.: 825,806

[22] Filed: Jan. 21, 1992

Related U.S. Application Data

[63] Continuation of Ser. No. 644,746, Jan. 23, 1991, abandoned, which is a continuation of Ser. No. 254,059, Oct. 6, 1988, abandoned.

[30] Foreign Application Priority Data

Oct. 6, 1987 [JP] Japan .................................. 62-252268
Oct. 6, 1987 [JP] Japan .................................. 62-252269

[51] Int. Cl.$^5$ ............................................. B60K 31/00
[52] U.S. Cl. .................................. 180/179; 364/426.04
[58] Field of Search ............... 180/176, 177, 178, 179; 364/426.04

[56] References Cited

U.S. PATENT DOCUMENTS

| | | | |
|---|---|---|---|
| 4,598,370 | 7/1986 | Nakajima | 364/426.04 |
| 4,763,912 | 8/1988 | Matsuda | 180/197 |
| 4,771,850 | 9/1988 | Matsuda | 180/197 |
| 4,829,438 | 5/1989 | Etoh | 364/426.04 |
| 4,835,696 | 5/1989 | Suzuki et al. | 364/426.04 |
| 4,845,622 | 7/1989 | Suzuki et al. | 364/426.04 |
| 4,870,584 | 9/1989 | Etoh et al. | 364/426.04 |

Primary Examiner—David M. Mitchell
Attorney, Agent, or Firm—Foley & Lardner

[57] ABSTRACT

A system and method for automatically controlling a vehicle speed to a desired cruise speed are disclosed in which a target opening angle of an engine throttle valve through which the vehicle can maintain a set cruise speed is derived in accordance with a prepared non-linear characteristic table and an opening angle of the throttle valve is controlled so that a detected vehicle speed coincides with the set cruise speed and a detected opening angle of the throttle valve coincides with the target opening angle. In addition, when the detected vehicle speed and detected opening angle are substantially constant for a predetermined time due to the vehicle being run on a flat road, average values of both detected vehicle speed and detected opening angle are derived and the above-described non-linear characteristic is corrected using both average values.

10 Claims, 6 Drawing Sheets

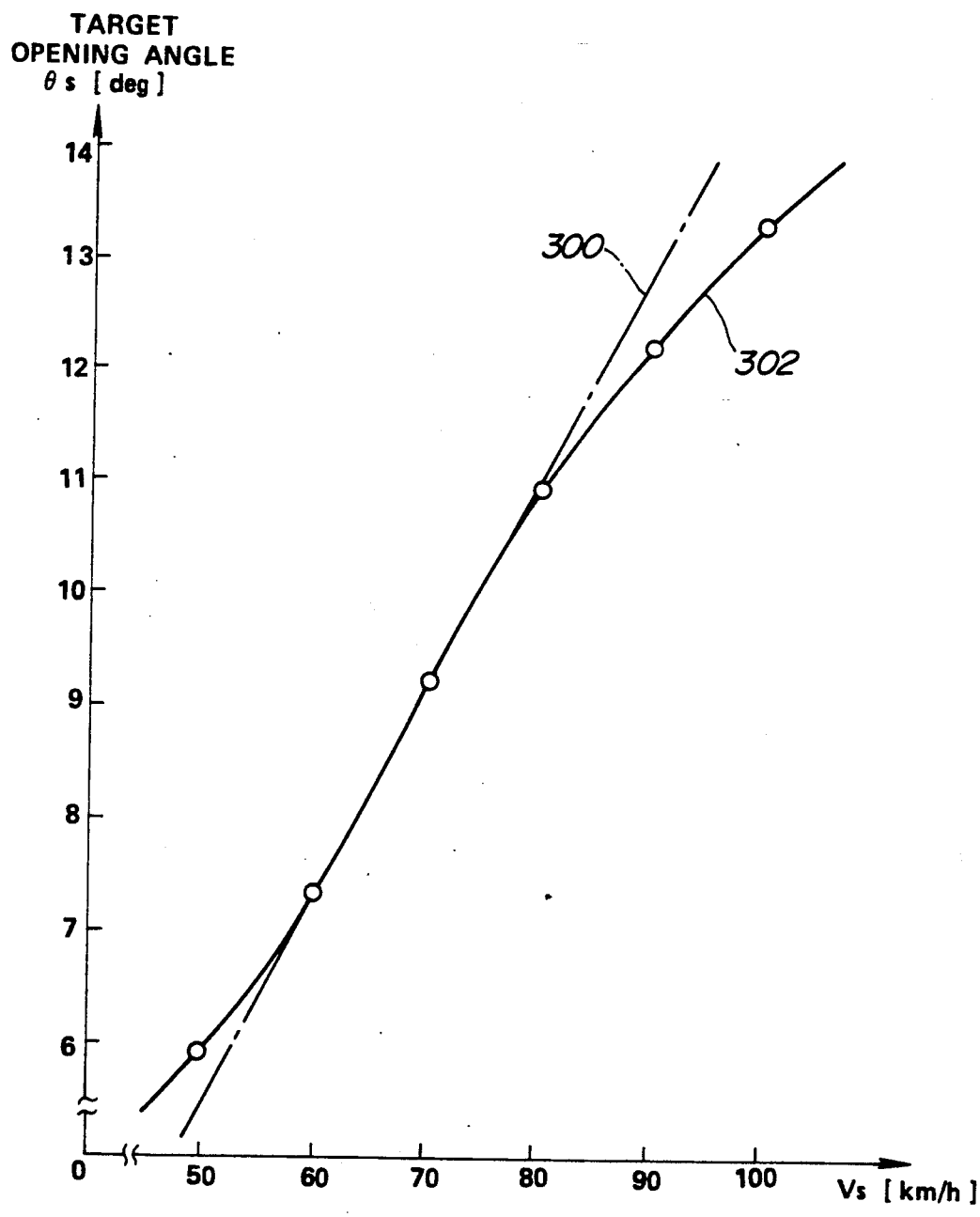

| ADDRESS | A(1) | A(2) | A(3) | A(4) | A(5) | A(6) | A(7) | A(8) | A(9) | A(10) | A(11) |
|---|---|---|---|---|---|---|---|---|---|---|---|
| SET VEHICLE SPEED $V_s$ [km/h] | 50 | 55 | 60 | 65 | 70 | 75 | 80 | 85 | 90 | 95 | 100 |
| CONVERSION COE. K [deg/(km/h)] | 0.117 | 0.118 | 0.121 | 0.126 | 0.131 | 0.133 | 0.136 | 0.136 | 0.135 | 0.134 | 0.133 |
| DATA | D(1) | D(2) | D(3) | D(4) | D(5) | D(6) | D(7) | D(8) | D(9) | D(10) | D(11) |

SYSTEM AND METHOD FOR AUTOMATICALLY CONTROLLING VEHICLE SPEED TO DESIRED CRUISE SPEED

This application is a continuation of application Ser. No. 07/644,746, filed Jan. 23, 1991, which is a continuation of Ser. No. 07/254,059, filed Oct. 6, 1988 both now abandoned.

BACKGROUND OF THE INVENTION (1) Field of the Invention

The present invention relates to a system and method for controlling automatically a vehicle speed to a desired cruise speed in which an opening angle of a throttle valve is controlled so that the vehicle speed coincides with a target vehicle speed at which the vehicle speed cruises.

(2) Background of the Art

A previously proposed various automatic vehicle speed controlling systems will be described below.

In the previously proposed automatic cruise speed controlling system, a target vehicle speed setting mechanism is provided through which the vehicle speed is set to a target vehicle speed at which a vehicle in which the system for automatically controlling the vehicle speed to a cruise speed is mounted cruises.

The current vehicle speed is detected by means of a vehicle speed detector. A first subtracter is provided which receives the target vehicle speed and current vehicle speed and subtracts the current vehicle speed from the target vehicle speed. A difference result between the current vehicle speed and target vehicle speed is supplied to a first multiplier. The first multiplier multiplies the difference result by a coefficient and supplies the multiplied result to a drive circuit via an adder. The drive circuit drives a throttle actuator for actuating an engine throttle valve. The throttle actuator actuates the throttle valve to open or close the throttle valve via an accelerator link mechanism constituted by a wire.

Consequently, the opening angle of the throttle valve is controlled so that the detected vehicle speed coincides with the target vehicle speed set through the target vehicle speed setting mechanism.

It is noted that the throttle valve is also controlled separately by means of a depression force exerted on an accelerator pedal.

In addition, the target vehicle speed value of the vehicle speed setting mechanism is supplied to a target opening angle calculator in which a table representing a conversion characteristic to be described below is prepared.

The target opening angle calculator derives a target opening angle of the throttle valve through which the vehicle can maintain the set target vehicle speed using the conversion characteristic and supplies the derived target opening angle to a subtracter.

The subtracter receives an actual opening angle of the throttle valve from an opening angle sensor and the target opening angle and subtracts the target opening angle from the actual opening angle.

The difference between the target and actual opening angles is supplied to a second multiplier in which the opening angle difference result is multiplied by a coefficient.

The multiplied value of the opening angle difference in the second multiplier is supplied to the above-described adder to add it to the other multiplied value in the above-described first multiplier.

Hence, the opening angle of the throttle valve is also controlled so that the detected opening angle coincides with the target opening angle corresponding to the set target vehicle speed.

In this way, the throttle valve is opened or closed in a direction toward which the vehicle speed difference and opening angle difference are both eliminated.

The conversion characteristic is linearly formed and, hence, a linear conversion of the set target vehicle speed is carried out by means of the target opening angle calculator in accordance with an equation expressed as follows. $\theta_s = K \times V_2$, wherein $\theta_s$ denotes the target opening angle of the throttle valve, K denotes the coefficient and its value denotes a gradient of the linear conversion characteristic and is set to, e.g., 11/80, and $V_s$ denotes the target vehicle speed.

However, it is noted that the relationship between the target vehicle speed at which the vehicle cruises and the opening angle of the throttle valve through which the vehicle can maintain the target vehicle speed is actually non-linear such that in a high vehicle speed region, the throttle valve opening angle is curved toward a lower direction with respect to the vehicle speed and, in a low speed region, the throttle valve opening angle is curved toward an upper direction. Therefore, the actual vehicle speed becomes above the set target vehicle speed in the high speed region and, on the contrary, the actual vehicle speed becomes lower than the set target vehicle speed in the low speed region.

Consequently, a response characteristic of control is reduced and fluctuations in the detected vehicle speed appear.

SUMMARY OF THE INVENTION

It is therefore an object of the present invention to provide a system and method for automatically controlling a vehicle speed to a desired vehicle speed which assures an automatic cruise control having a high response characteristic without fluctuations in the vehicle speed.

The above-described object can be achieved by providing a system for automatically controlling a vehicle speed to a desired vehicle speed, comprising: (a) first means through which a desired target vehicle speed at which the vehicle cruises is set., (b) second means for deriving a target variable for determining a driving force of a vehicular engine through which the set target vehicle speed can actually be maintained in accordance with a non-linear characteristic representing an actual relationship between the set target vehicle speed and target variable, (c) third means for detecting a current vehicle speed, (d) fourth means for detecting an actual variable of the driving force from a driving force adjusting mechanism in a vehicular engine., and (e) fifth means for controlling the variable of the driving force adjusting mechanism so as to eliminate a difference of the detected vehicle speed from the set target vehicle speed and difference of the detected variable from the target variable.

The above-described object can also be achieved by providing a system for automatically controlling a vehicle speed to a desired vehicle speed, comprising: (a) first means through which a desired target vehicle speed at which the vehicle cruises is set., (b) second means for deriving a target opening angle for determining a driving force of a vehicular engine through which the set target vehicle speed can actually be maintained in accordance with a non-linear characteristic representing an actual relationship between the set target vehicle speed and target opening angle., (c) third means for detecting a current vehicle speed., (d) fourth means for detecting an actual opening angle from an engine throttle valve in a vehicular engine, and (e) fifth means for controlling the opening angle of the engine throttle valve so as to eliminate a difference of the detected vehicle speed from the set target vehicle speed and difference of the detected variable from the target opening angle.

The above-described object can also be achieved by providing a method for automatically controlling a vehicle speed to a desired cruise speed, comprising the steps of: (a) providing first means through which a desired target vehicle speed at which the vehicle cruises is set, (b) after the set of the desired target vehicle speed through the first means in the step (a), deriving a target variable for determining a driving force of a vehicular engine through which the set target vehicle speed can actually be maintained in accordance with a non-linear characteristic representing an actual relationship between the set target vehicle speed and target variable, (c) detecting a current vehicle speed., (d) detecting an actual variable of the driving force from a driving force adjusting mechanism in a vehicular engine, and (e) controlling the variable of the driving force adjusting mechanism so as to eliminate a difference of the detected vehicle speed from the set target vehicle speed and difference of the detected variable from the target variable.

BRIEF DESCRIPTION OF THE DRAWINGS

FIG. 2 (A) is a characteristic graph representing an actual relationship between a set cruise speed (target vehicle speed) and a target opening angle of an engine throttle valve used in the first preferred embodiment shown in FIG. 1.

FIG. 2 (B) is an example of a table representing a target vehicle speed $V_s$ versus conversion coefficient K.

DETAILED DESCRIPTION OF THE PREFERRED EMBODIMENTS

Reference will hereinafter be made to the drawings in order to facilitate understanding of the present invention.

FIRST PREFERRED EMBODIMENT

Figure 1:
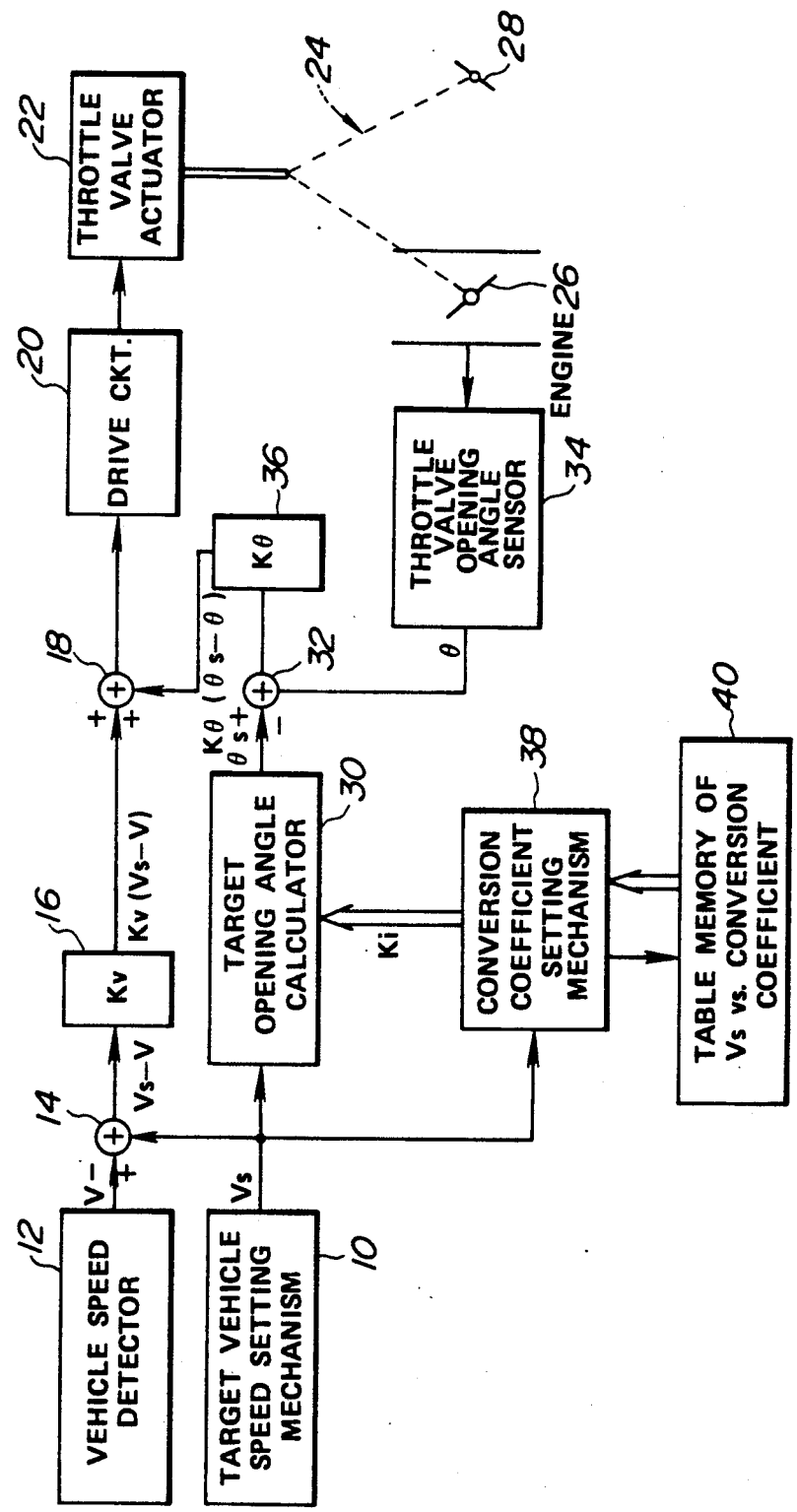
FIG. 1 is a schematic circuit block diagram of a system for automatically controlling a vehicle speed to a desired cruise speed in a first preferred embodiment according to the present invention.

FIG. 1 shows a first preferred embodiment of a system for automatically controlling a vehicle speed to a desired cruise speed applicable to a vehicle.

In FIG. 1, a vehicle speed detector 12 detects a vehicle speed V, a target vehicle speed setting mechanism 10 sets a target vehicle speed $V_s$ by a vehicle driver. A first subtracter 14 subtracts the target vehicle speed $V_s$ from the vehicle speed V as expressed by $V_s-V$. A first multiplier 16 multiplies the difference result $(V_s \times V)$ by a coefficient $K_V$ as expressed by $K_V \times (V_s-V)$. A first adder 18 adds the value of $K_V \times (V_s-V)$ and a value of $K\theta$ $(\theta_s-\theta)$ derived from a second multiplier 36 to be described later. A drive circuit 20 receives the added result of actuating an engine throttle valve 26 via an accelerator link 24 connected to accelerator 28. The structure of the throttle actuator 20 is exemplified by a U.S. Pat. Application Ser. No. 143,092 filed on Jan. 12, 1988, the disclosure of which is hereby incorporated by reference.

An opening angle sensor 34 associated with the throttle valve 26 supplies a signal indicating the opening angle of the throttle valve 26 to a second subtracter 32. The second subtracter 32 receives a signal indicating a target opening angle $\theta_s$ of the throttle valve 26 from a target opening angle calculator 30 to be described later and the actual opening angle signal from the opening angle sensor 34.

The target opening angle calculator 30 retrieves a value of the target opening angle $K_i$ from a conversion coefficient setting mechanism 38.

It is noted that the general construction of the automatic cruise controlling system is substantially the same as described in the Background of the art in the present specification.

However, in the first preferred embodiment, the target opening angle calculator 30 converts the set cruise speed (target vehicle speed) $V_s$ into the target opening angle $\theta_s$ using a conversion coefficient $K_i$ set in the conversion coefficient setting mechanism 38 (it is noted that a subscript i of the conversion coefficient $K_i$ indicates a time pass with the predetermined control period as a unit).

The conversion coefficient setting mechanism 38 derives the conversion coefficient $K_i$ using a target vehicle speed/conversion coefficient corresponding table 40 on the basis of the target vehicle speed set through the target vehicle speed setting mechanism 10.

FIG. 2 (A) shows a characteristic graph representing an actual relationship of the set cruise speed $V_s$ [Km/h] versus target opening angle $\theta_s$ [degrees].

In FIG. 2 (A), 302 denotes the actual relationship between the target vehicle speed $V_s$ and target opening angle $\theta_s$ of the throttle valve 26. As shown in FIG. 2 (A), the relationship described above s non-linear.

It is noted that 300 denotes the previous relationship used in the previously proposed automatic cruise controlling system.

FIG. 2 (B) shows the contents of the target vehicle speed/ conversion coefficient corresponding table 40.

As shown in FIG. 2 (B), addresses of A (1), A(2), A(3), A(4), A(5), A(6), A(7), A(8), A(9), A(10), and A(11) stores the set cruise speed $V_s$=50, 55, 60, 65, 70, 75, 80, 85, 90, 95, and 100 Km/h at an interval of 5 Km/h, respectively.

Furthermore, the addresses A(1), A(2), A(3), A(4), A(5), A(6), A(7), A(8), A(9), A(10), and A(11) store data D(1), D(2), D(3), D(4), D(5), D(6), D(7), D(8), D(9), D(10), and D(11) representing the values of conversion coefficients K, 0,117, 0.118, 0.121, 0.126, 0. 131, 0.133, 0.136, 0.136, 0.135, 0.134, and 0.133 [deg/(Km/h)], respectively.

Figures 2B, 3:
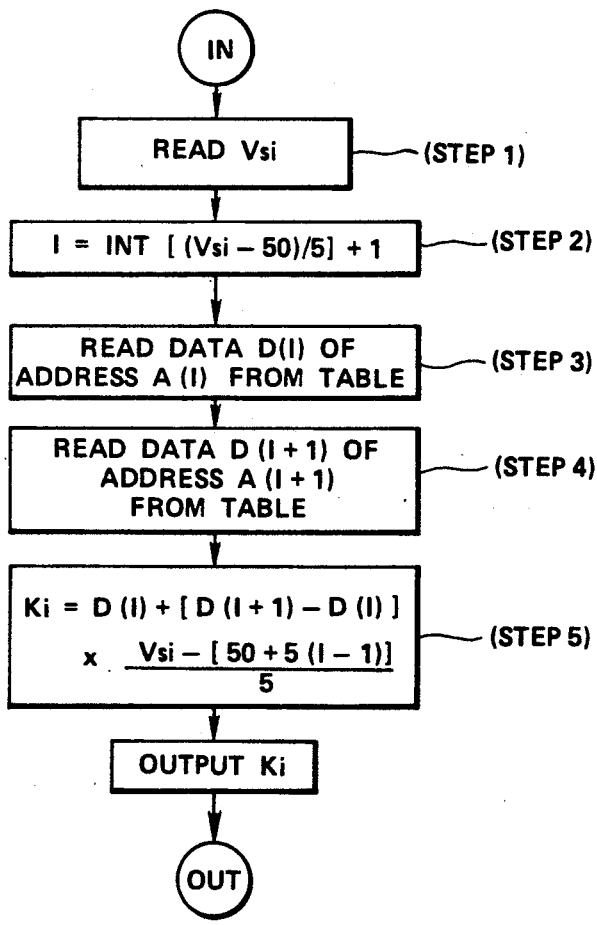
FIG. 3 is an operational flowchart for explaining an operation of a conversion coefficient setting mechanism shown in FIG. 1.

FIG. 3 shows an operational flowchart for explaining the operation of the conversion coefficient setting mechanism 38.

In a first step Step 1, the present set cruise speed $V_{si}$ is read from the target vehicle speed setting mechanism 10 (i denotes the time pass in the same way as in the case of the above-described conversion coefficient).

In a second step Step 2, an address pointer value I is derived in accordance with the following equation.

$$I = INT[V_{si} - 50)/\}5.$$

In a third step Step 3, the conversion coefficient data D (1) of the address A(1) indicated by the address pointer value I is read from the target vehicle speed/conversion coefficient corresponding table 40.

In a fourth step Step 4, the conversion coefficient data D(I+1) in the address A(I+1) is read.

In the way described above, when the conversion coefficient data D(I), D(I+1) are read, the conversion coefficient $K_i$ is derived in a step Step 5 in accordance with the following equation.

$$K_i = D(I) + [D(I+1) - D(I)] \times \{V_{si} - [50 + (I-1)]/\}5.$$

Then, the conversion coefficient $K_i$ is set.

For example, in the step Step 1, in a case where as the present set cruise speed $V_{si} = 68$ Km/h is inputted (read), $I = 4$ in the step Step 2, $D(4) = 0.126$ in the step Step 3, $D(5) = 0.131$ in the step Step 4 are respectively derived. In the step Step 5, the conversion coefficient $K_i = 0.129$ corresponding to the set cruise speed $V_s = 68$ Km/h.

The derived conversion coefficient $K_i$ is outputted from the conversion coefficient setting mechanism 38 to the target opening angle calculator 30 in a step Step 6 to calculate the target opening angle $\theta_s$ as follows.

$$\theta_s = K_i \times V_s$$

It is noted that each conversion coefficient K shown in FIG. 2 (B) is set with the actual relationship between the vehicle speed and opening angle of the throttle valve 26 taken into account.

When the above-described interpolation calculation in the step Step 5 is carried out, in the vehicle having the non-linear characteristic of the set cruise speed versus target opening angle, the target throttle valve opening angle $\theta_s$ is calculated in the target vehicle speed calculator 30.

As described above, in the first preferred embodiment, even if the target vehicle speed is set in any of the vehicle speed regions, a stationary vehicle speed difference does not occur. Consequently, the responsive characteristic of the automatic cruise control can be improved with the vehicle speed remarkably fluctuations suppressed.

It is noted that a settable range of the target vehicle speed can be extended in such a way as 30 Km/h to 120 Km/h and the interval of the vehicle speed in the table shown in FIG. 2 (B) can be changed.

SECOND PREFERRED EMBODIMENT

Figure 4:
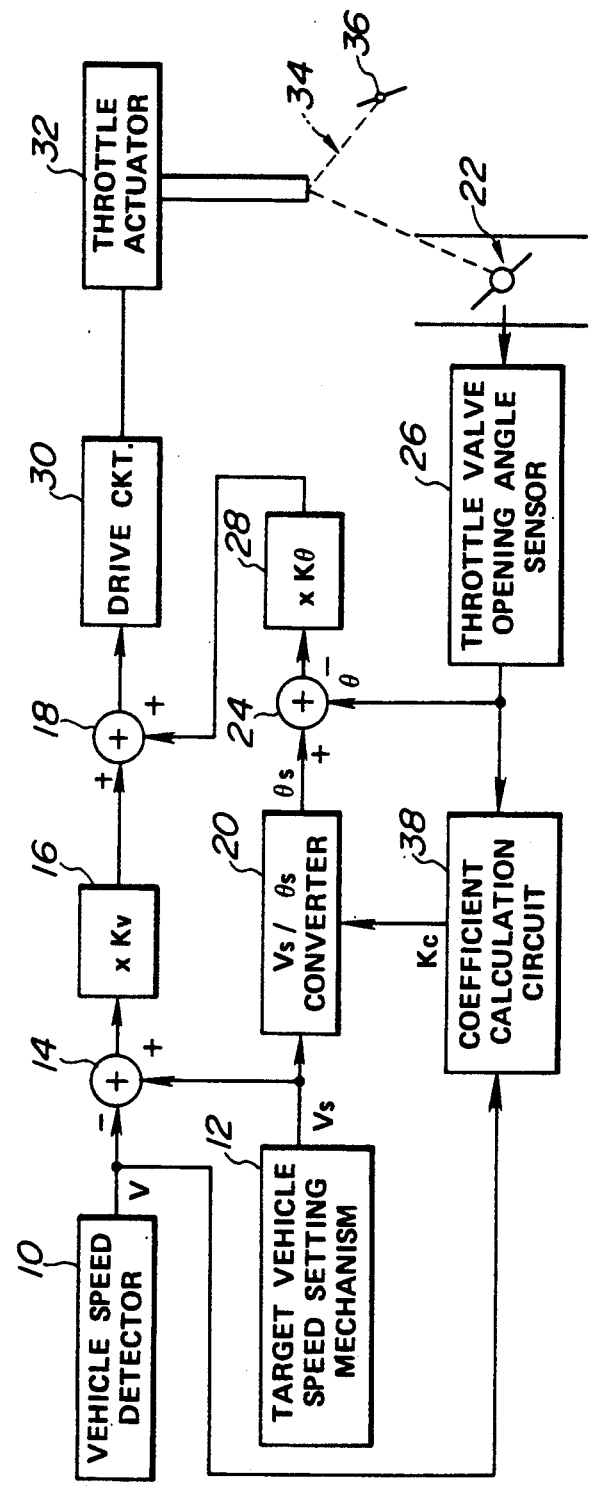
FIG. 4 is a schematic circuit block diagram of the automatically controlling the vehicle speed to the desired cruise speed in a second preferred embodiment.

FIG. 4 shows a second preferred embodiment of the automatic cruise speed controlling system.

Although the reference numerals are different from the first preferred embodiment, the vehicle speed detector 10, target vehicle speed setting mechanism 12, first subtracter 14, multipliers 16, 28, the adders 18, 24, drive circuit 30, the throttle actuator 32, opening angle sensor 26, throttle valve 22, accelerator link 34, and accelerator 36 have the same functions as described in the first preferred embodiment.

In the second preferred embodiment, the detected vehicle speed V of the vehicle speed detector 10 and the detected opening angle from the opening angle sensor 26 are supplied to a coefficient calculator 38 in which a conversion coefficient Kc is derived using these values V and $\theta$.

It is noted that the conversion coefficient Kc is supplied to a $V_s/\theta_s$ converter 20 in which the set cruise speed $V_s$ is multiplied by the conversion coefficient $K_c$. Thus, the target opening angle $\theta_s$ $(= Kc \times V_s)$ of the throttle valve 22 is calculated.

Figure 5:
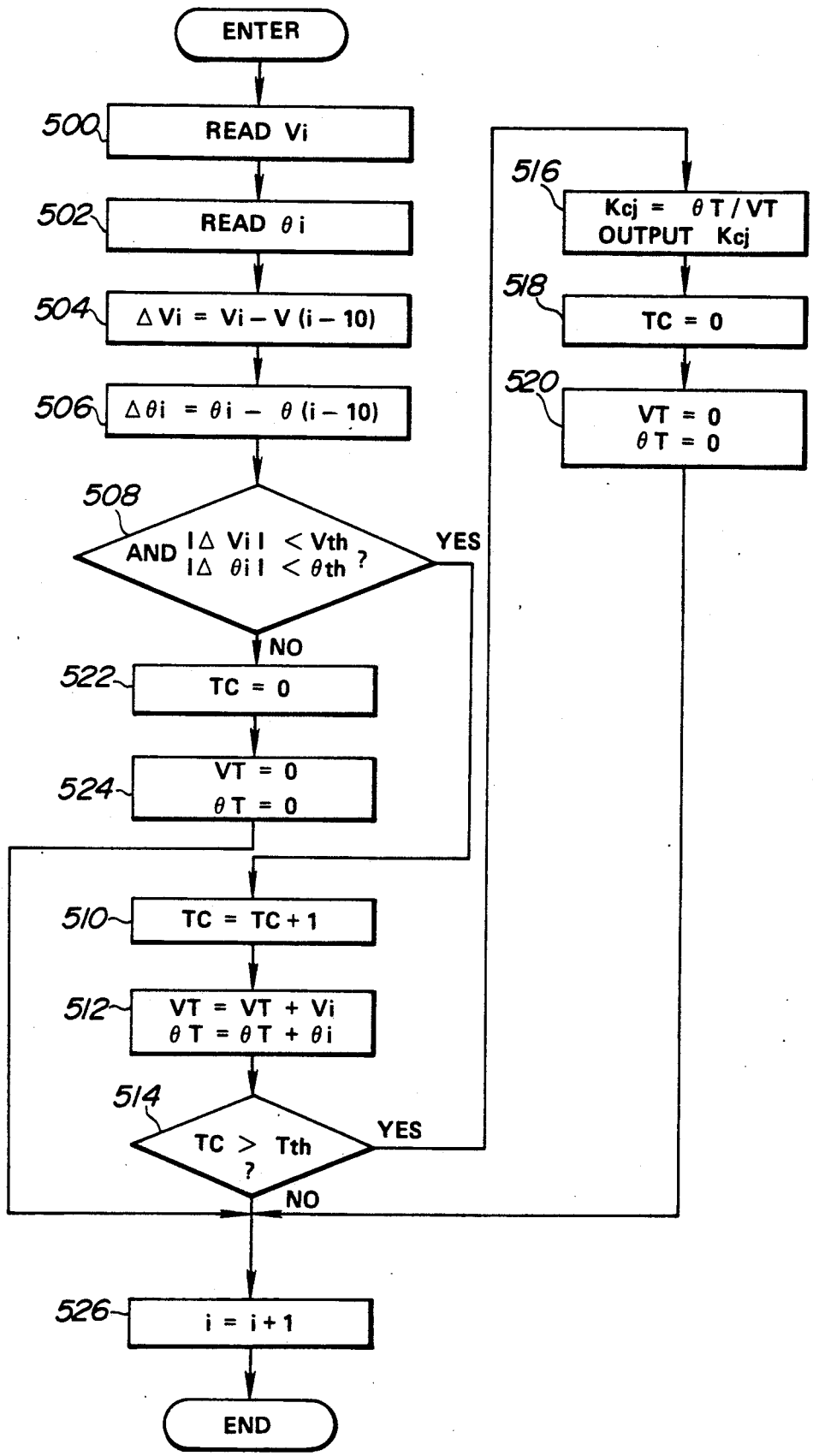
FIG. 5 is an operational flowchart for explaining the operation of the automatically controlling the vehicle speed to the desired cruise speed shown in FIG. 4.
Figure 6A:
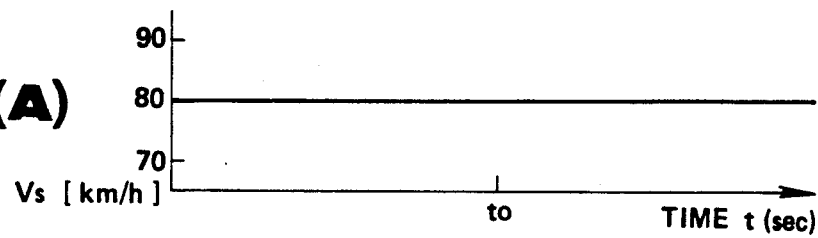
FIGS. 6 (A) to 6 (D) are characteristic graphs of vehicle speeds and opening angle for explaining the operations of the system shown in FIG. 4.
Figure 6B:
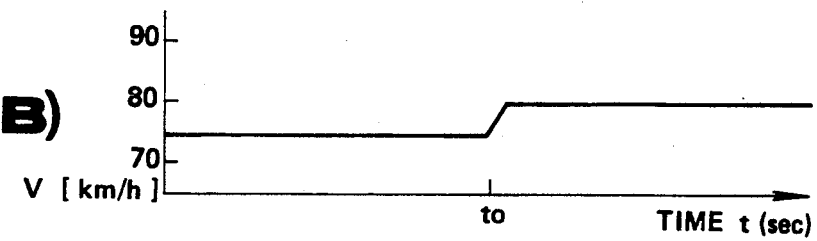
Figure 6C:
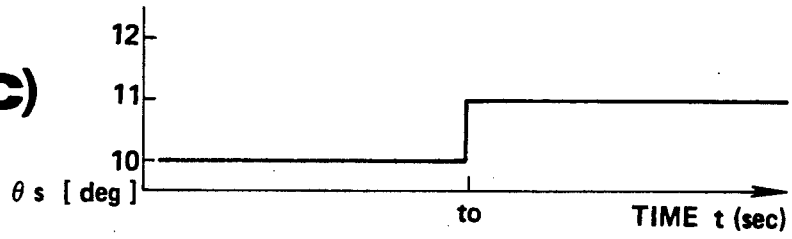
Figure 6D:
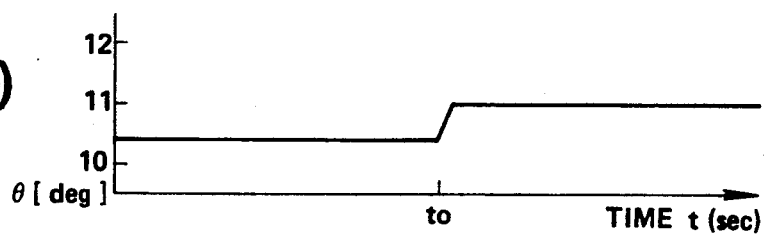

FIG. 5 shows an operational flowchart of the coefficient calculator 38.

In a step 500, the coefficient calculator 38 reads the detected vehicle speed $V_i$ ( the subscript of i in $V_i$ denotes a time pass of the control period with, e.g., 100 msec as a unit).

When the detected opening angle $\theta_i$ is inputted from the opening angle sensor 26 in a step 502, a change rate of the vehicle speed denoted by delta $V_i$ $(= V_i - V_{(i-10)})$ is calculated in a step 504, Then, in a step 506, a change rate of the opening angle of the throttle valve denoted by delta $\theta_i$ $(= \theta_i - \theta_{(i-10)})$ is derived.

In the next step 508, the calculator 38 determines whether an absolute value of the vehicle speed change rate delta $V_i$ is below a set value $V_{th}$ (for example, 1 Km/h/sec.) and the opening angle change rate delta $\theta_i$ is below a set value $\theta_{th}$. If no (|delta $V_i| \geq V_{th}$ and |delta $\theta_i | \geq \theta_{th}$ in the step 508 (in this case, the vehicle does not run in a flat road, a count value TC and accumulated value $\theta T$ are reset in steps 510 and 512 and the value i is incremented in a step 526. then the routine shown in FIG. 5 is repeated.

In addition, when the vehicle speed change rate delta $V_i$ and opening angle change rate delta $\theta_i$ are below the respective set values $v_{th}$ and $\theta_{th}$ (the vehicle runs on the flat road) in the step 508, the count value TC is incremented in a step 510.

Then, in a step 512, the accumulated values VT and $\theta T$ of the detected vehicle speed $V_i$ and opening angle $\theta_i$ are derived.

Thereafter, when the count value TC exceeds a set value $T_{th}$ so that the vehicle runs on the flat road for a predetermined time (Yes in a step 514), the conversion coefficient $Kc_j$ is derived by a division of the opening angle accumulated value $\theta T$ by the vehicle speed accumulated value VT. Then, the conversion coefficient $Kc_j$ is outputted to the $V_s/\theta_s$ converter 20 in the step 516.

Then, the count value TC and accumulated values VT and $\theta T$ are reset to zero in steps 518 and 520.

FIGS. 6 (A) to 6 (D) show operations in the second preferred embodiment.

In FIGS. 6 (A) to 6 (D), the set cruise speed $V_s$ is constant.

In addition, the vehicle cruises on the road for the predetermined time until a time $t_o$. Then, the conversion coefficient Kc (for example, Kc = 10/80) is derived in the time $t_o$.

It is noted that the conversion characteristic in the $V_s/\theta_s$ converter 20 is not accommodated with a power performance of the vehicle and therefore an error occurs in the actual opening angle $\theta$ with respect to the target opening angle $\theta_s$, thereby generating a stational error (about 5 Km/h) in the actual vehicle speed V for the set cruise speed $V_s$.

During such a flat road cruise, the coefficient calculator 38 derives the conversion coefficient Kc in accordance with the flowchart shown in FIG. 5 using an average vehicle speed value and an average opening angle value at the time $t_o$.

Hence, the target opening angle $\theta_s$ which has indicated 10 degrees is changed to 11 degrees and, consequently, the stationary error of difference ($-5$ Km/h) of the actual vehicle speed V with respect to the set cruise speed $V_s$ is eliminated which has been generated before the time $t_o$.

As described above, in the second preferred embodiment, since the characteristic of conversion from the set cruise speed $V_s$ to the target vehicle speed $V_s$ is automatically corrected due to the vehicle's run on the flat road, much effort and time for the setting operation are not required and the development of the system can thus become facilitated.

In addition, in the second preferred embodiment, since the mounting error of the throttle opening angle sensor 26 can automatically be absorbed due to the above-described correction, the assembly of the system can be simplified.

Furthermore, in the second preferred embodiment, since the conversion coefficient Kc can be calculated using the average values of the vehicle speed and opening angle of the throttle valve 22 during the vehicle's run on the flat road, the optimum characteristic of conversion which can accurately be accommodated to the power performance of the vehicle even if the flat road on which the vehicle runs is not perfectly flat. Consequently, the favorable cruise control of the system can always be achieved.

It is noted that since the relationship between the vehicle speed V and opening angle $\theta$ of the throttle valve 22 is actually non-linear, the region of the target cruise speed $V_s$ is divided into a plurality of segments and the correction coefficient Kc may preferably be prepared for each segment.

As described hereinabove, since, in the system and method for automatically controlling the vehicle speed to the desired vehicle speed according to the present invention, the non-linear characteristic representing the actual relationship between the set cruise speed $V_s$ and target opening angle of the engine throttle valve $\theta_s$ is prepared, the target opening angle of the throttle valve through which the set cruise speed can be maintained using the set cruise speed is derived in accordance with the non-linear characteristic, and the opening angle of the throttle valve is controlled in a direction toward which the deviation (difference) of the actual opening angle from the target opening angle is eliminated, such a state that the stationary difference of opening angle occurs due to the set vehicle speed can be avoided. Consequently, a high responsive characteristic control of the cruise speed can be achieved with suppression of the vehicle speed fluctuations.

Furthermore, since the conversion characteristic from the target vehicle speed to the target opening angle of the throttle valve is automatically and accurately corrected during the vehicle cruise run on the flat road, the setting of the conversion charatcteristic and mounting of the opening angle sensor for the throttle valve can be facilitated and favorable automatic cruise control can be achieved.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for automatically controlling a vehicle speed to a desired cruise speed for a vehicle, comprising:
   a) first means for setting the vehicle speed to the desired cruise speed;
   b) second means for deriving a target operating variable of an engine driving force adjusting mechanism which controls a driving force of a vehicular engine, said target operating variable determining a driving force through which the target vehicle speed can actually be maintained, wherein said second means derives said operating variable in accordance with a substantially non-linear characteristic representing an actual relationship of the operating variable to the vehicle speed, the non-linear characteristic being such that, as the vehicle speed is increased above a first predetermined vehicle speed, the operating variable is increased to exceed a straight line characteristic, but as the vehicle speed is decreased below a second predetermined vehicle speed, the operating variable is decreased below the straight line, the first predetermined vehicle speed being higher than the second predetermined vehicle speed and the characteristic of the operating variable being generally co-linear with the straight line charactertistic when the vehicle speed is between the first and second predetermined vehicle speeds;
   c) third means for detecting a current vehicle speed;
   d) fourth means for detecting a current operating variable of the engine driving force adjusting mechanism; and,
   e) fifth means for controlling the operating variable of the engine driving force adjusting mechanism on the basis of the target operating variable and the target vehicle speed so as to eliminate a difference between the detected vehicle speed and target vehicle speed and a difference between the target operating variable and the detected operating variable.

2. A system for automatically controlling a vehicle speed to a desired cruise speed for a vehicle as set forth in claim 1, wherein the first predetermined vehicle speed is approximately 80 Km/h and the second predetermined vehicle speed is approximately 60 Km/h.

3. A system for automatically controlling a vehicle speed to a desired cruise speed for a vehicle as set forth in claim 1, wherein the second means includes sixth means for registering the non-linear characteristic so as to retrieve the target operating variable with respect to the target vehicle speed therefrom.

4. A system for automatically controlling a vehicle speed to a desired cruise speed for a vehicle as set forth in claim 3, which further includes:
   seventh means for determining whether both the detected vehicle speed and the detected variable are substantially constant for a predetermined time;
   eighth means for deriving average values of the detected operating variable and the detected vehicle speed when the seventh means determines that both detected vehicle speed and the detected operating variable are substantially constant for the predetermined time; and ninth means for correcting the non-linear characteristic registered in the sixth means using the average value derived by the eighth means.

5. A system for automatically controlling a vehicle speed to a desired cruise speed for a vehicle as set forth in claim 4, wherein the operating variable is an opening angle of an engine throttle valve and the engine driving force adjusting mechanism is the engine throttle valve.

6. A system for automatically controlling a vehicle speed to a desired cruise speed for a vehicle as set forth in claim 5, wherein the second means derives the target opening angle of the engine throttle valve utilizing the equation: $\theta s = Ki \times Vs$, wherein Vs denotes the set cruise speed and Ki denotes a current conversion coefficient based on the non-linear characteristic and is derived in the following equation: $Ki = D(I) + [D(I+1) - D(I)] \times \{Vsi - [50 + 5(i-1)]\}/5$, wherein $D(I)$ denotes conversion coefficient data in an address of $A(I)$ in the sixth means, $D(I+1)$ denotes conversion coefficient data in another address $A(I+1)$ in the sixth means, Vsi denotes the set cruise speed at a predetermined control period denoted by i, the set cruise speed is registered in the sixth means for each 5 Km/h, and I denotes a pointer value of each address allocated in the sixth means and is derived as follows: $I = INT[(Vs-50)/5] + 1$.

7. A system for automatically controlling a vehicle speed to a desired cruise speed for a vehicle as set forth in claim 6, wherein the seventh means calculates a change rate of the detected vehicle speed and a change rate of the detected opening angle, determines whether the change rate of the detected vehicle speed is below a first set value and whether the change rate of the detected opening angle is below a second set value, and determines whether the predetermined time has passed in a state where the change rate of the vehicle speed is below the first set value and the change rate of the opening angle of the throttle valve is below the second set value, and the eighth means derives accumulated values of both detected vehicle speed and the detected opening angle for the predetermined time and divides the accumulated value of the detected vehicle speed by the accumulated value of the detected opening angle to divide the conversion coefficient Kcj, and the ninth means corrects the nonlinear characteristic registered in the sixth means in accordance with an equation such as $\theta s = Kc \times Vs$, wherein Kc is Kcj derived by the eighth means and j denotes the present predetermined control period.

8. A system for automatically controlling a vehicle speed to a desired cruise speed for a vehicle as set forth in claim 7, wherein the first set value is 1 Km/h/sec. and the predetermined control period is 100 milliseconds.

9. A system for automatically controlling a vehicle speed to a desired vehicle speed, comprising:

a) first means through which a desired target vehicle speed at which the vehicle cruises is set;

b) second means for deriving a target variable for determining a driving force of a vehicular engine through which the set target vehicle speed can actually be maintained in accordance with a non-linear characteristic representing an actual relationship between the set target vehicle speed and the target variable;

c) third means for detecting a current vehicle speed;

d) fourth means for detecting an actual variable of the driving force from a driving force adjusting mechanism in a vehicular engine; and e) fifth means for controlling the variable of the driving force adjusting mechanism so as to eliminate a difference of the detected vehicle speed from the set target vehicle speed and a difference of the detected variable form the target variable form the target variable; wherein the second means includes means for calculating a conversion coefficient in dependence on the target vehicle speed; and means for multiplying the conversion coefficient by the target vehicle speed to obtain the target variable.

10. A method for automatically controlling a vehicle speed to a desired cruise speed for a vehicle, comprising the steps of:

a) setting the vehicle speed to the desired cruise speed;

b) deriving a target operating variable of an engine driving force adjusting mechanism which controls a driving force of a vehicular engine, said target operating variable determining a driving force through which the target vehicle speed can actually be maintained, wherein said deriving step comprises deriving said operating variable in accordance with a substantially non-linear characteristic representing an actual relationship of the operating variable to the vehicle speed, the non-linear characteristic being such that, as the vehicle speed is increased above a first predetermined vehicle speed, the operating variable is increased to exceed a straight line characteristic, but as the vehicle speed is decreased below a second predetermined vehicle speed, the operating variable is decreased below the straight line, the first predetermined vehicle speed being higher than the second predetermined vehicle speed and the characteristic of the operating variable being generally co-linear with the straight line characteristic when the vehicle speed is between the first and second predetermined vehicle speeds;

c) detecting a current vehicle speed;

d) detecting a current operating variable of the engine driving force adjusting mechanism; and, e) controlling the operating variable of the engine driving force adjusting mechanism on the basis of the target operating variable and the target vehicle speed so as to eliminate a difference between the detected vehicle speed and target vehicle speed and a difference between the target operating variable and the detected operating variable.

* * * * *